Feb. 2, 1965 W. E. STREETER 3,167,870
LEVEL AND VIAL SUPPORT THEREFOR
Filed Feb. 23, 1961 2 Sheets-Sheet 2

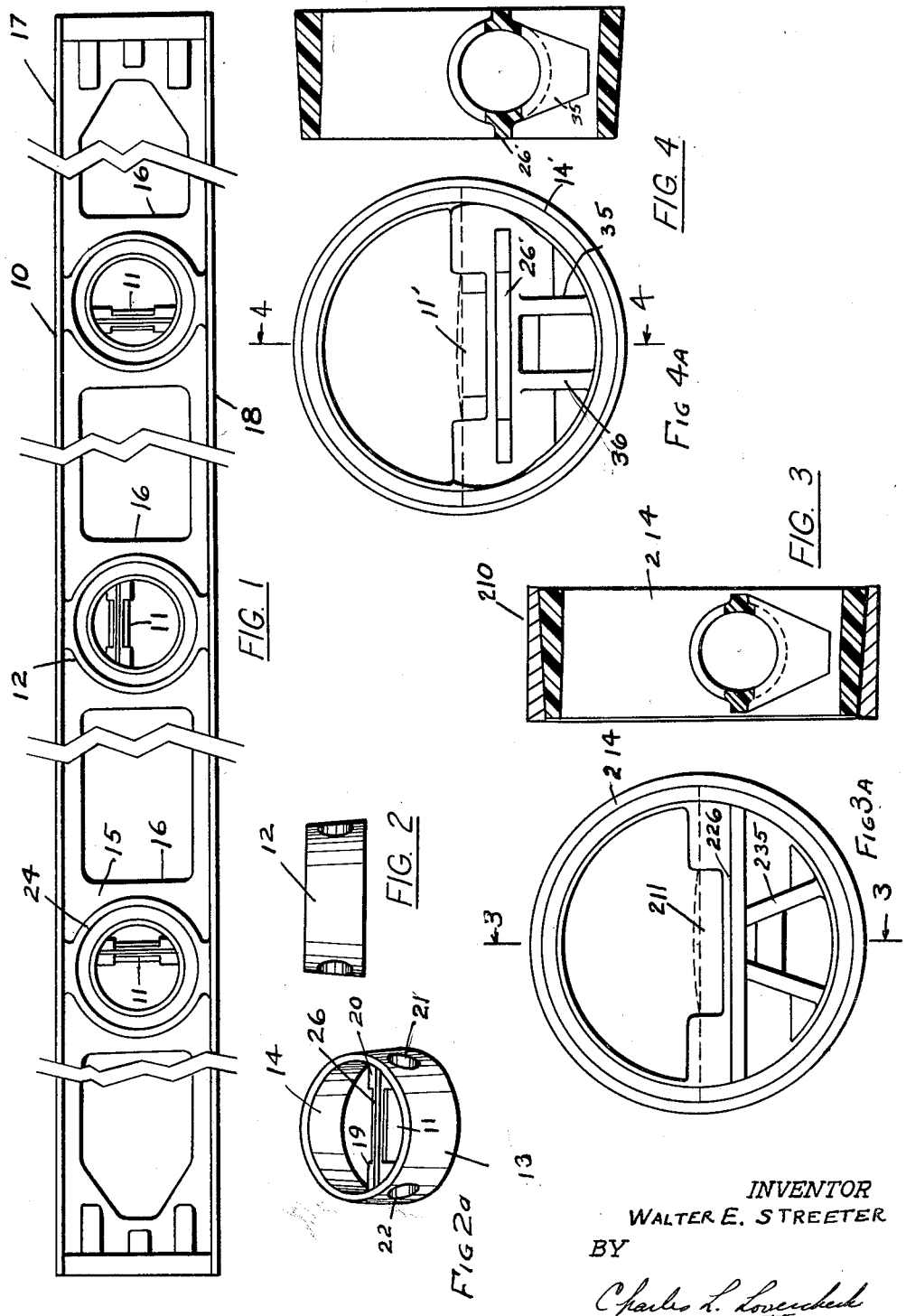

INVENTOR
WALTER E. STREETER
BY
Charles T. Lovercheck
attorney

United States Patent Office 3,167,870
Patented Feb. 2, 1965

3,167,870
LEVEL AND VIAL SUPPORT THEREFOR
Walter E. Streeter, 2622 Sunnydale Blvd., Erie, Pa.
Filed Feb. 23, 1961, Ser. No. 91,263
13 Claims. (Cl. 33—211)

This invention relates to improvements in spirit levels.

The invention disclosed herein improves the design of vial sleeves by the addition of integral guards to provide protection for the glass vial and by other means to facilitate the assembly of the sleeve to the level frame.

One of the objects of this invention is to provide a type of vial mounting which will insure adequate protection for the vials in those levels which do not use glass lenses for this purpose.

Another object of the invention is to provide a sleeve, with or without this protective device, which can be quickly and accurately assembled to the level frame, making full use of epoxy glues for permanently securing it in place. To accomplish this, a gluing track has been added to the periphery of the sleeve mounting which corresponds to a groove cast or machined in the level frame.

A further object of the invention is to provide a vial mounting for a spirit level which is simple and pleasing in appearance, efficient, and strong in construction.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit thereof or from the scope of the appended claims.

In the drawings:

FIG. 1 is a side view of a spirit level according to the invention;

FIG. 2 is a side view of the vial sleeve shown in FIG. 1;

FIG. 2a is an isometric view of the vial sleeve;

FIG. 3 is a cross sectional view taken on line 3—3 of FIG. 3A of another embodiment of the invention;

FIG. 3A is a side view of the vial sleeve shown in FIG. 3;

FIG. 4 is a cross sectional view taken on line 4—4 of FIG. 4A of another embodiment of the vial sleeve;

Figure 5:
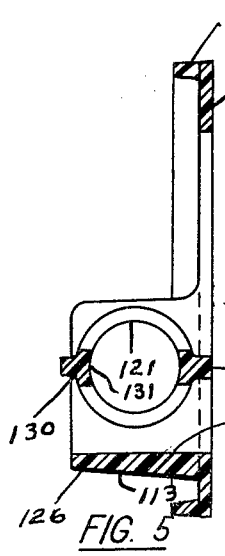
FIG. 5 is a cross sectional view taken on line 5—5 of FIG. 6 of another embodiment of the invention.

Now with more particular reference to the drawings, a spirit level is shown by way of example in the embodiment shown in FIGS. 1, 2, and 2a. A spirit level body or frame 10 has three bosses 24 in which three lateral openings 21 are formed. These openings have inside surfaces which may be shaped to conform to the surface of the frustum of a cone and they each receive a level vial sleeve 12 containing a vial 11. The vial sleeves 12 have relatively thin walls defined by an outside frustoconical surface 13 and an inside surface 14. The outside surface 13 conforms to and is complementary in shape to the inside surface of the openings 21 in the bosses 24.

The level body 10 may be cast of aluminum or other suitable material and it has a web portion 15 having openings 16 formed therein to reduce the weight thereof and edge flanges 17 and 18 to provide strength. The flanges 17 and 18 are connected together by the webs 15 and the webs 15 connect the bosses 24 to the flanges 17 and 18.

The insides of the vial sleeves 12 have bosses 19 and 20 integrally attached thereto and these bosses have bores therein which extend through and communicate with bores 21 and 22 in the vial sleeves 12. The bores 21 and 22 receive the level vial 11. The vial is slidably received in the bores 21 and 22 and is secured by a suitable adhesive.

A guard rib 26 is integrally attached to the bosses 19 and 20. This rib forms a brace to make the vial sleeve rigid and, at the same time, forms a guard to protect the vial. The brace also gives the vial sleeve a pleasing appearance. The vial sleeve may be made of high impact styrene or other suitable material.

The outside surface 13 of the sleeve will have a taper of about three degrees to the central axis thereof, conforming to the opening of the boss 24 when made of an aluminum casting and allowing the sleeve to be supported snugly in the openings.

When the level is to be assembled, the operator may place a suitable amount of adhesive on the inside surface of the level boss 24 and the sleeve can then be inserted into the opening in the level boss 24 and indexed to the proper position. If the frame is supported on a level surface, the operator may rotate the sleeve 12 until the bubble centers in the vial, thereby indicating that it is in the proper position. If it is left in this position, the sleeve will be bonded by the adhesive on the outside thereof in the proper position in the level frame.

The embodiment of the invention shown in FIGS. 3 and 3A is substantially identical to those shown in FIGS. 1, 2, and 2a and FIGS. 4 and 4A except that reinforcing members 235 are integrally attached to a reinforcing member 226 and their inner ends diverge outwardly from each other and are attached to a member 214 at their outer ends.

The embodiment of the invention shown in FIGS. 4 and 4A is substantially identical to that shown in FIGS. 1, 2, and 2a except that reinforcing members 35 and 36 are integrally connected to an outside ring 14' at their outer ends and to ribs 26' at their inner ends and extend at right angles thereto. The outside ring 14' supports a level vial 11'.

Figure 6:
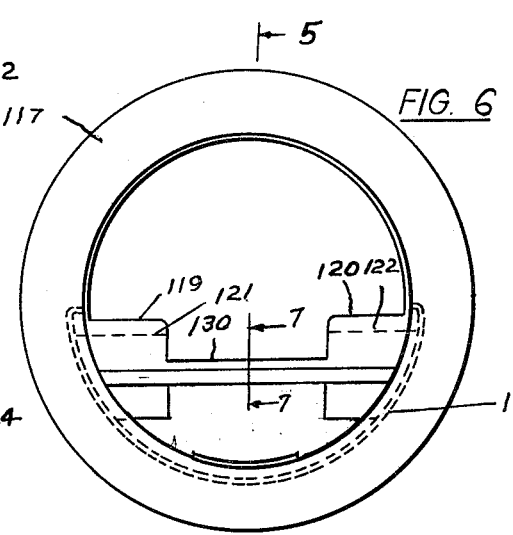
FIG. 6 is a view of one of the vial sleeves for a two vial level boss which has a gluing track.
Figure 7:
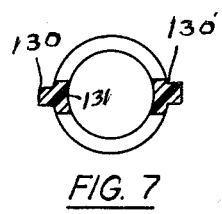
FIG. 7 is a cross sectional view taken on line 7—7 of FIG. 6.
Figures 8, 9, 10:
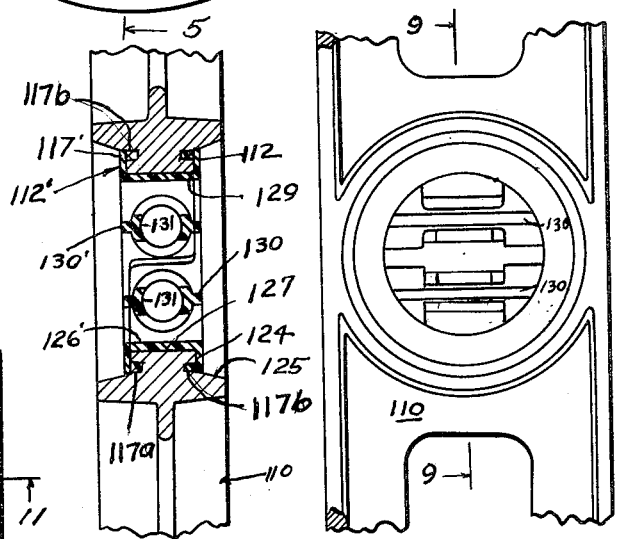
FIG. 8 is a side view of a part of a spirit level body.
FIG. 9 is a cross sectional view taken on line 9—9 of FIG. 10.
FIG. 10 is a side view of the spirit level shown in FIG. 9.
Figure 11:
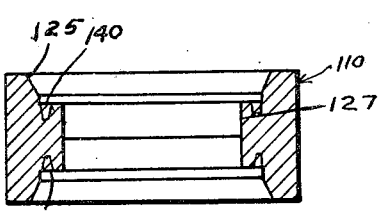
FIG. 11 is a cross sectional view taken on line 11—11 of FIG. 8 with the level removed.

The embodiment of the invention shown in FIGS. 5 to 11 inclusive discloses a dual vial support for use with a level frame requiring two vials in each level boss. A vial sleeve 112 may be inserted from one side and another vial sleeve 112' inserted from the other side. The vial sleeves 112 and 112' may be identical, each having a flange 117 with an outside diameter which conforms to the opening of the level boss shown in FIG. 1. The flange 117 has a laterally extending annular flange 117a which engages an annular groove 117b and holds the vial sleeve rigidly in position.

A laterally extending, hemi-frustoconical flange 126 is integrally attached to the annular flange 117a. The flange 126 has a hemi-frustoconical outside surface 113 which provides a clearance between itself and the inside of an opening 127 in the level frame. The second vial sleeve 112' has a similar hemi-cylindrical surface 126'. The surface 126' engages the flange 117 at 129. Bosses 119 and 120 are integrally attached to the flange 126 and they have bores 121 and 122 which each receive an end of a level vial. Bars 130 and 130' are integrally attached to the bosses at each end and have an inside concave surface 131 which receives the vial.

To use the device, the vial is first inserted in the cored bores 121 and 122 of the sleeve and, when properly aligned, it is secured in place with suitable adhesive. Glue is placed in a recess 140 of the level frame. The sleeve is inserted into this recess and rotated to its proper position. This procedure is duplicated to assemble the sleeve in recess 140'.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A support for a level vial comprising a ring member having spaced inwardly extending bosses on the inside of said ring member, a bar integrally attached to each outer side of each said boss, each said boss having a bore aligned with the bore in the other said boss, and a level vial having its ends disposed in said bosses and extending therebetween, one of said bars extending along each side of said vial forming a protection therefor.

2. The support recited in claim 1 wherein a part of said level vial extends above said bars.

3. The support recited in claim 1 wherein spaced leg members are integrally attached to said bars and to the inside edges of said ring member below said bars.

4. The support recited in claim 3 wherein said leg members diverge from one side of said level vial and outwardly.

5. A level comprising an elongated level body having an opening therein, said opening having an inside surface conforming to the surface of the frustum of a cone, a support for a level vial in said opening, said level vial support comprising a ring member having spaced inwardly extending bosses on the inside thereof, a bar integrally attached to each outer side of each said boss, each said boss having a bore aligned with the bore in the other said boss, and a level vial having its ends disposed in said bosses and extending therebetween, one of said bars extending along each side of said vial forming a protection therefor.

6. The level recited in claim 5 wherein spaced leg members are integrally attached to said bars and to the inside edges of said ring member below said bars.

7. The level recited in claim 6 wherein said leg members diverge from one side of said level and outwardly.

8. A level vial support comprising a flat annular member having a laterally extending flange integrally attached thereto and having an outside surface defining a lateral half of a frustum of a cone, spaced bosses on said flange extending toward each other, each said boss having a bore aligned with the bore in the other said boss, a level vial having one of its ends in each said bore, and a bar having one of its ends attached to each said boss and extending therebetween, said bar forming a guard for said vial.

9. Two supports for level vials, each said support comprising a flat annular member having a laterally extending flange integrally attached thereto and having an outside surface defining a lateral half of a frustum of a cone, spaced bosses on said flange extending toward each other, each said boss having a bore aligned with the bore in the other said boss, a level vial having one of its ends in each said bore, and a bar having one of its ends attached to each said boss and extending therebetween, said bar forming a guard for said vial, said supports being disposed with said flanges disposed in spaced parallel planes and each of said flanges extending toward the annular member to which the other said flange is attached.

10. A level comprising an elongated body having a straight edge, an opening in said body, said opening having each side half thereof converging inwardly toward the other and each defining a frusto-conical surface, a support for said level, said support comprising a flat annular member having a laterally extending flange integrally attached thereto and having an outside surface defining a lateral half of a frustum of a cone, spaced bosses on said flange extending toward each other, each said boss having a bore aligned with the bore in the other said boss, a level vial having one of its ends in each said bore, and a bar having one of its ends attached to each said boss and extending therebetween, said bar forming a guard for said vial, said support being disposed with said flange disposed in a spaced parallel plane and said flange extending toward said annular member, said support outside surfaces being complementary to said inside surface of said opening in said body, said support being secured in said opening in said body.

11. A support for level vials comprising an annular flange generally flat in cross section, a hemi-cylindrical, laterally extending flange integrally attached thereto, a boss attached to each diametrically opposite side of said hemi-cylindrical flange, said bosses being bored to receive a level vial to extend therebetween, and spaced bars integrally attached to one said boss at one end and to the other said boss at the other end and extending therebetween, the insides of said bars having a concave surface generally conforming to the inside surface of said bores in said bosses.

12. The support recited in claim 11 wherein spaced reinforcing members are integrally attached to said bars and extend to the inside of said hemi-cylindrical flange generally perpendicular to said bars and are integrally attached to said hemi-cylindrical flange.

13. A support for level vials comprising members each having an annular flange generally flat in cross section, a hemi-cylindrical, laterally extending flange integrally attached thereto, a boss attached to each diametrically opposite side of said hemi-cylindrical flange, said bosses being bored to receive a level vial to extend therebetween, spaced bars integrally attached to one said boss at one end and to the other said boss at the other end and extending therebetween, the inside of said bars having a concave surface generally conforming to the inside surface of the bores in said bars, a level body, and a laterally extending opening in said body, one said annular flange being disposed along each side of said body, said hemi-cylindrical flange extending into said opening in said body, said vials being adapted to lie generally parallel to each other.

References Cited in the file of this patent
UNITED STATES PATENTS

| | | |
|---|---|---|
| 618,254 | Morrison | Jan. 24, 1899 |
| 1,305,496 | Salt | June 3, 1919 |
| 1,435,365 | Zieman | Nov. 14, 1922 |
| 2,813,349 | Harris | Nov. 19, 1957 |